INVENTORS
JEAN JARRET and JACQUES JARRET

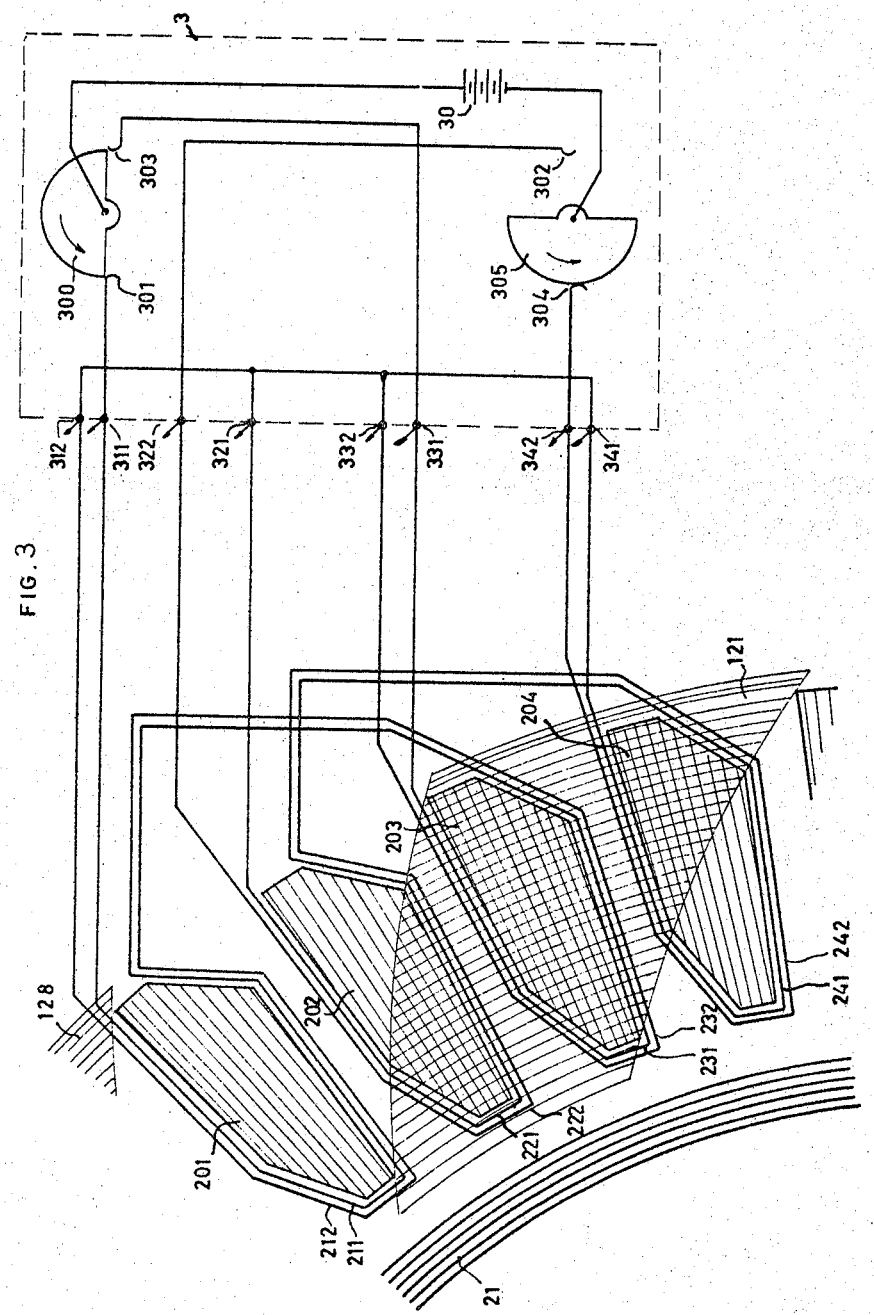

INVENTORS
JEAN JARRET and JACQUES JARRE

United States Patent Office 3,435,266
Patented Mar. 25, 1969

3,435,266
VARIABLE SPEED ELECTRIC MOTOR
Jean Jarret, La Champanelle Chemin du Clos Baron, Fourqueux, and Jacques Jarret, 35 bis Ave. de Belloy, Le Vesinet, France
Filed May 16, 1966, Ser. No. 550,440
Claims priority, application France, May 19, 1965, 17,569
Int. Cl. H02h 1/16
U.S. Cl. 310—164     3 Claims

ABSTRACT OF THE DISCLOSURE

A variable-reluctance electric motor comprising a ring-shaped stator having at least one group of four consecutive independent magnetic elements regularly distributed around its axis and each including at least one switchable winding, and a rotor having for each said group a ferromagnetic tooth made of magnetically insulated laminations, in which said elements and teeth are so shaped that the alternating voltage induced in said windings is of trapezoidal wave-shape, said windings being wound in opposite directions for any two alternate magnetic elements, whereby the magnetic flux in each tooth keeps a constant value for a given rotor speed.

This invention relates to a variable-reluctance electric machine operable as a variable-speed direct current motor which can provide a high starting torque.

Variable-reluctance electric machines comprising conductorless rotors can of course be used as variable-speed motors by switching of the stator windings; as a rule, the switching is performed under the control of rotor movement by an appropriate electronic device. However, the back electromotive force induced in the stator windings by magnetic flux variations due to the movement of the rotor teeth, varies periodically at a frequency associated with the speed of rotor rotation, and so the torque provided for a given current is not constant.

It is an object of the present invention to provide an improved variable-reluctance machine providing a constant torque for a given current.

According to the invention, a variable-reluctance electric motor comprises a ring-shaped stator having at least one group of four consecutive magnetically independent magnetic elements with a common energizing winding, said magnetic elements being equally distributed around the peripheral part of said stator, each of said magnetic elements being provided with at least one switchable winding, and a rotor having one ferromagnetic tooth for each of said groups of four magnetic elements, said teeth being formed by ferromagnetic laminations separated from each other by a nonferromagnetic medium and adapted to pass said magnetic elements with a residual air-gap between them, said magnetic elements and said teeth being so shaped and disposed that the electromotive force induced in said switchable windings by the rotation of said rotor is an alternating voltage of substantially trapezoidal shape and the switchable windings of each pair of alternate magnetic elements being wound in opposite directions and connected in series, whereby for a given speed of the rotor, the magnetic flux in each rotor tooth is constant.

According to another feature of the invention, each stator magnetic element has two windings wound in opposite directions, the two magnetic elements of each pair have their oppositely wound windings connected in series and a synchronous switching device connects said windings to a D.C. source in such a manner that the ampere-turns created by the resulting current through said windings is additive to the field created by said energizing winding in a magnetic element whose overlapping area by a rotor tooth is increasing and subtractive to said field in a magnetic element whose overlaping area by a rotor tooth is decreasing.

In one embodiment of the invention, a variable-reluctance D.C. motor has the general shape and structure of the constant flux variable-reluctance electric machine described in our copending application Ser. No. 497,016, filed Oct. 18, 1965, now U.S. Patent 3,383,533. Said embodiment comprises a cylindrical central ferromagnetic core, a stator comprising an energizing winding in the form of a cylindrical ring coaxially encircling the central part of the central core, ferromagnetic stator inserts which have flat end surfaces, are magnetically independent of one another and are disposed star fashion around the energizing winding, and a rotor including two rings of teeth made of pure iron strips separated from one another by a layer of air or other insulating material and disposed parallel to the axis of the central core and symmetrically in relation to the central plane of the stator inserts and facing the stator, on two ferromagnetic side or end plates so rotatable around the axis of the central core that the ends of the teeth move symmetrically past and near the axial ends of the stator inserts.

According to another feature of the embodiment just described, in any angular position of the rotor each rotor tooth has complementary overlaps with end surfaces of alternate paired inserts, and the space between two consecutive rotor teeth occupies an area identical to the area of one tooth.

Since the movement of a rotor tooth in an air gap varies the magnetic flux in the gap proportionally to the variation of the quantity of ferromagnetic material present in the air gap at a given rotor speed, the electromotive force induced in the winding of each stator insert varies in the same proportion. Also, since the overlapped areas of the two stator inserts forming a single pair are complementary, the sum of the fluxes through them is constant. Further, since the oppositely wound windings of the latter stator inserts are serially connected, the electromotive forces induced in the latter windings are cumulative, and since alternate stator inserts are paired, the sum of electromotive forces induced in the windings of each group of two pairs of stator inserts is constant.

The invention will be further described by way of example, with reference to the accompanying drawings in which.

Figure 2:
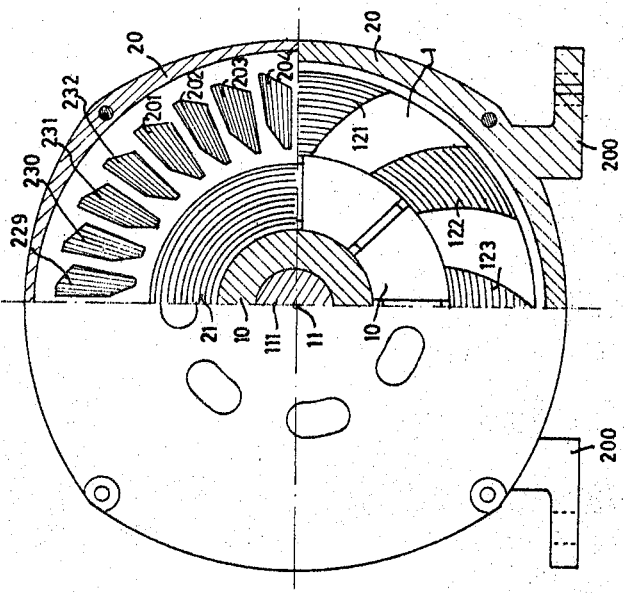
FIGURE 2 is a half-section on FIGURE 1 looking from the left, on the line A—A in the top part of the motor to show the stator inserts, and on the line B—B in the bottom part to show the rotor teeth.
Figure 1:
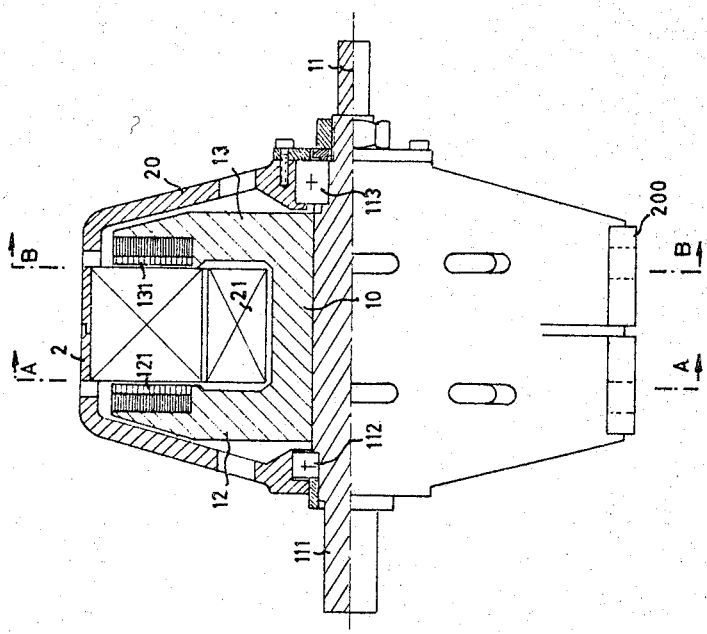
FIGURE 1 is a diagrammatic view in half axial section of a motor according to the invention.
Figure 4:
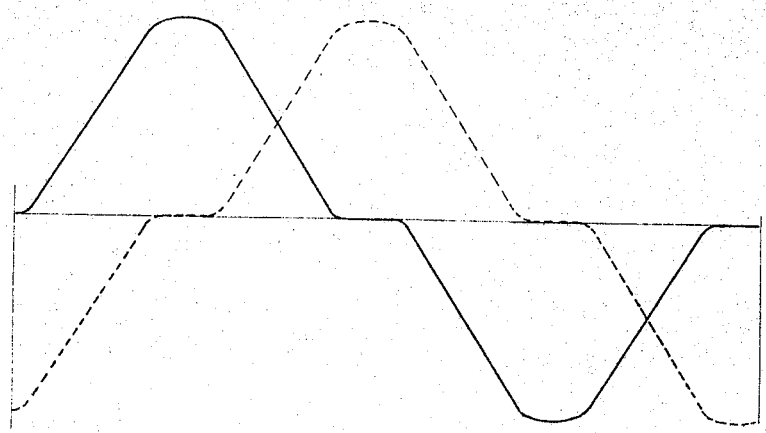

FIGURE 3 is a basic diagram of the windings of the stator inserts of the motor shown in FIGURES 1 and 2 and of the synchronous commutating means for such windings; and FIGURE 4 is an experimental graph showing the electromotive forces which the passage of a rotor tooth of a machine shown in FIGURES 1 and 2 operating as an alternator induces in the windings of two pairs of alternately paired inserts of the stator.

The motor shown in the drawings comprises a rotor 1 formed by a central core 10 which is a volume of revolution around axis 11 of the machine and is rigidly connected to a shaft 111 mounted on bearings 112, 113. The core 10 has two side or end plates 12, 13 which are symmetrically situated in relation to a plane perpendicular to the axis 11 and which each have eight teeth 121–128 and 131–138, respectively, projecting symmetrically in a direction perpendicular to the latter plane.

The stator 2 has a generally annular shape and is held in the space lying between the central core 10 and the end plates 12, 13 by an outer shell 20. Such outer shell 20 comprises a base 200 and completely encircles the rotor 1, the shaft 111 of which is mounted in the shell 20 with the interposition of bearings 112, 113. In the annular space between the rotor teeth, the stator 2 has a ring of thirty-two inserts 201–232 each having around it two oppositely wound windings, as 211, 212, as shown in FIGURE 3; in the annular space between the un-toothed portions of the plates 12, 13 adjacent to the core 10 an energizing winding 21 having an axis parallel to the axis 11 tightly encircles the central portion of the rotor core 10.

The rotor teeth, such as 121, 131, are formed by pure iron strips separated from one another by an insulating material so that the proportion of pure iron in the volume of the teeth projecting from the facing surfaces of the plates 12, 13 is between 0.5 and 0.85. The rotor teeth are so shaped that at any time each of them overlaps complementary portions of end surfaces of two alternate stator inserts, and the stator inserts are so shaped that the area of a stator insert which is covered by a rotor tooth varies linearly with the angular movement of such tooth in each half of the covered part of the stator insert, the variation being in the sense of an increase over the first half and of a decrease, over the second half, the rate of increase or decrease being equal.

FIGURE 3 diagrammatically shows the windings of one group of two pairs of alternately paired stator inserts 201, 203 and 202, 204 and also shows the basis of synchronous commutation of such windings by a switching device 3 which is shown as an electromechanical device for simplicity, but which in practice is some conventional form of synchronous electronic commutation system. The stator has eight groups of two pairs of stator inserts and these groups have like windings connected in parallel to input terminals 311–312, 321–322, 331–332 and 341–342 of the switching device 3, as indicated by arrows symbolizing multiple connections to the terminals mentioned. The stator insert 201 has two windings 211, 212 wound in opposite directions, and the inserts 202, 203, 204 respectively have windings 221, 231, 241 wound in the same direction as the winding 211, and windings 222, 232, 242 wound in the same direction as the winding 212. The oppositely wound windings of the stator inserts 201, 203 and those of the stator inserts 202, 204 are connected in series i.e. the winding 211 with the winding 232 and the windings 221, 231, 241 with the windings 242, 212, 222 respectively.

Assuming that the energizing winding 21 is energized and the system 3 disconnected, if the rotor is rotated so that the tooth 121 passes by the stator inserts 204 to 201, the voltage produced between the terminals 311, 332 of the serially connected windings 211, 232 are represented by the solid-line curve in FIGURE 4 and the voltages produced between the terminals 321, 342 of the serially connected windings 221, 242 are represented by the chain-dotted curve in the same figure. Clearly, these signals have a substantially trapezoidal shape, a factor facilitating their commutation by the switching device 3.

The purpose of the switching device 3 is to energize the windings of each stator insert with currents whose ampere-turns are additive to the ampere-turns of the constant energizing current of the winding 21 when the area of the stator insert covered by a rotor tooth increases, but which are subtracted from the energizing ampere-turns when the latter area—in other words, the quantity of iron present in the air gap of the particular stator insert concerned—decreases.

To show a characteristic time during commutation of the windings in synchronism with rotor rotation, FIGURE 3 shows a rotor tooth 121 which leaves the stator insert 201 completely uncovered and therefore completely covers the stator insert 203 and half the area of each of the stator inserts 202, 204. On the assumption that the rotor rotates in the anticlockwise direction as seen in FIGURES 2 and 3 the tooth 121 so moves from the position shown in FIGURE 3 as to start to cover the stator insert 201 and to uncover the insert 203, while the rotor-movement-dependent variation in the surface covered by each of the teeth 202, 204 changes sign.

The switching device 3 comprises a D.C. source 30 which cyclically supplies four serially connected consecutive combinations of windings of the stator inserts 201–204 in a manner shown symbolically by the association of two pairs of contacts 301, 303 and 302, 304 with two circular conductive cams 300, 305 which are so synchronized with rotor rotation as to rotate in the same direction as the latter but eight times faster, and are arranged to have a phase difference of 90 degrees.

The cam 300 alternatively connects to the positive terminal of the source 30 the input 311 of the winding 211 of the stator insert 201 via the contact 301, and the input 331 of the winding 231 of the stator insert 203 via the contact 303. The cam 305 alternately connects to the negative terminal of the source 30, with a quarter-revolution delay with respect to the cam 300, the output 322 of the winding 222 of the insert 202 via the contact 302, and the output 342 of the winding 242 of the insert 204 via the contact 304. The terminals 312, 321, 332, 341 are interconnected. Consequently, when the contact 301 is closed the windings 211, 232 are consecutively connected in series via the contact 304 with the windings 221, 242 and, via the contact 302, with the windings 241, 222. Similarly, when the contact 303 is closed the circuit of the windings 231, 212 is closed consecutively via the serially connected windings 241, 222 through the agency of the contact 302 and via the serially connected windings 221, 242 through the agency of the contact 304.

The contacts 301, 303 are simultaneously the first to close and the second to open when a tooth takes, relatively to the inserts 201–204, the position in which the tooth 121 is shown in FIGURE 3, i.e., every eighth of a revolution of the rotor, and are operated in the opposite sense when the tooth has advanced by two inserts, i.e., when the rotor has rotated by one-sixteenth of a revolution from such position. The contacts 302, 304 close and open, respectively, when a tooth has advanced by one stator insert from the position shown for the tooth 121 in FIGURE 3—i.e., one-thirty second of a rotor revolution later—and operates in the opposite sense one-sixteenth of a rotor revolution later.

The windings system 211, 232 and 212, 231 therefore delivers a substantially trapezoidal signal at a frequency equal to 16 times the speed of rotor rotation expressed in revolutions per second, and the windings system 221, 242 and 222, 241 delivers a substantially trapezoidal signal at the same frequency but out of phase by one-thirty second of a revolution—i.e., one half-period—relatively to the former signal.

In the position shown in FIGURE 3, the windings 211, 232 in which a positive-slope signal is originating are energized via the contacts 301, 304 in series with the windings 221, 242 which deliver a signal whose slope is changing sign and becoming negative, while the windings 231, 212 are disconnected because the contact 303 is open. Similarly, after the rotor has rotated through one-thirty second of a revolution and, therefore, after the cams 300, 305 have rotated through one-quarter of a revolution, the windings 221, 242 are disconnected by the contact 304 opening, whereas the circuit of the windings 211, 232 whose signal is changing its slope is connected in series with the windings 241, 222 by the contact 302 closing, and so on. The total electromotive force is therefore constant, to the extent that commutation times are negligible. Consequently, since the current supplied by the source 30 is constant, the motor torque is constant.

What we claim is:

1. A variable-reluctance electric motor comprising a ring shaped stator having at least one group of four consecutive magnetically independent magnetic elements with a common energizing winding, said magnetic elements being equally distributed around the axis of said ring shaped stator, each of said magnetic elements being provided with at least one switchable winding; a rotor having at least one disc shaped flange coaxial with said stator; an air gap between each of said magnetic elements and each of said flanges, said flanges being provided with one tooth for each of said groups of four magnetic elements, said teeth being formed by ferromagnetic laminations separated from each other by a nonferromagnetic medium and adapted to pass in said air-gaps, each of said teeth overlapping complementary areas of each of two pairs of alternate magnetic elements in any angular position of the rotor.

2. A variable-reluctance electric motor according to claim 1 wherein each of said stator magnetic elements is provided with two switchable windings wound in opposite directions, the oppositely wound switchable windings of each pair of alternate magnetic elements being connected in series, and wherein said switchable windings are connected, by means of a switching device synchronized with the rotation of the rotor, to a direct-current source.

3. A variable-reluctance electric motor comprising a ring shaped stator having a number of magnetically independent magnetic elements mutliple of four provided with a common energizing winding, each of said magnetic elements being provided with two switchable windings wound in opposite directions, the oppositely wound switchable windings of each pair of alternate magnetic elements being connected in series; a rotor comprising two disc-shaped ferromagnetic flanges coaxial with said stator and disposed symmetrically in relation to the central plane of said stator magnetic elements, each of said flanges bearing a number of teeth equal to one-quarter of the number of said stator magnetic elements, said teeth being formed by ferromagnetic laminations separated from each other by a non-ferromagnetic medium and projecting axially in direction of said central plane, the teeth of said two flanges being disposed to pass symmetrically near the axial ends of said stator magnetic elements and each of said teeth overlapping complementary areas of each of two pairs of alternate magnetic elements in any angular position of the rotor.

References Cited

UNITED STATES PATENTS

| | | | |
|---|---|---|---|
| 1,928,872 | 10/1933 | Sherwin | 310—46 |
| 2,109,111 | 2/1938 | Gearhart | 310—46 |
| 2,171,979 | 9/1939 | Gillen | 310—46 |

MILTON O. HIRSHFIELD, *Primary Examiner.*

L. L. SMITH, *Assistant Examiner.*

U.S. Cl. X.R.

310—159